(12) United States Patent
Cohen (10) Patent No.: US 11,096,339 B2
(45) Date of Patent: Aug. 24, 2021

(54) DRIP IRRIGATION SYSTEM (71) Applicant: Barak Cohen, Ramat Raziel (IL)

(72) Inventor: Barak Cohen, Ramat Raziel (IL)

(73) Assignee: Barak Cohen, Ramat Raziel (IL)

( * ) Notice: Subject to any disclaimer, the term of this patent is extended or adjusted under 35 U.S.C. 154(b) by 173 days.

(21) Appl. No.: 16/260,163

(22) Filed: Jan. 29, 2019

(65) Prior Publication Data
US 2019/0230874 A1 Aug. 1, 2019

(30) Foreign Application Priority Data
Feb. 1, 2018 (IL) ............................................ 257308

(51) Int. Cl.
A01G 25/02 (2006.01)
A01G 27/02 (2006.01)
A01G 13/02 (2006.01)

(52) U.S. Cl.
CPC ......... *A01G 25/02* (2013.01); *A01G 13/0281* (2013.01); *A01G 27/02* (2013.01)

(58) Field of Classification Search
CPC ........ A01G 31/02; A01G 7/045; A01G 9/249; A01G 2/00; A01G 9/246; A01G 27/003;
(Continued)

(56) References Cited
U.S. PATENT DOCUMENTS

| 195,094 | A | * | 9/1877 | Crowther | ............... | A01G 27/02 |
| | | | | | | 47/79 |
| 289,102 | A | * | 11/1883 | Holden | ................... | A01G 27/02 |
| | | | | | | 47/79 |

(Continued)

FOREIGN PATENT DOCUMENTS

| CN | 204598865 | 9/2015 |
| GB | 2370482 | 7/2002 |

(Continued)

OTHER PUBLICATIONS

Karin Kloosterman, Tal Ya Water Irrigation Trays Make Water from Dew, Green Tech and Gadgets, Jun. 6, 2009.

(Continued)

Primary Examiner — Tien Q Dinh
Assistant Examiner — Zoe Tam Tran (57) ABSTRACT

A drip irrigation unit, comprising: a bottom, generally cup-shaped, member having a bottom member base in which a plant-inserting opening is defined, a peripheral closed-loop wall extending upward from a peripheral edge of the bottom member to a first apex, and an internal closed-loop wall extending upwards from a peripheral edge of the plant-inserting opening to a second apex that is lower than the first apex, the peripheral and internal walls being integral with the bottom member base and defining a water reservoir, and a top member having an aperture and a rim, an annular surface defined between the rim and the aperture being downwardly sloped towards the aperture and defining a generally funnel-shape, the top member being connectable to at least one of the first or second apexes, such that the plant-inserting opening and the aperture become aligned, the internal closed-loop wall having at least one perforation vertically distanced from the bottom member base, the at least one perforation defining a water flow path from the reservoir to the plant-inserting opening.

20 Claims, 9 Drawing Sheets (58) Field of Classification Search
CPC ........ A01G 27/005; A01G 7/02; A01G 9/006; A01G 9/02; A01G 9/021; A01G 9/0293; A01G 9/247; A01G 25/02; A01G 13/0281; A01G 27/02; B65H 18/16; B65H 18/28; C02F 1/4674; C02F 2001/46142; C02F 2001/46161; C02F 2001/46171; C02F 2103/008; C02F 2201/46105; C02F 2201/4615; C02F 2301/046

See application file for complete search history.

(56) References Cited

U.S. PATENT DOCUMENTS

| | | | | |
|---|---|---|---|---|
| 2,026,679 | A * | 1/1936 | Higgins | A01G 9/02 47/65.6 |
| 4,121,734 | A * | 10/1978 | Soong | A01G 27/006 222/54 |
| 4,745,707 | A | 5/1988 | Newby | |
| 6,038,813 | A * | 3/2000 | Moore | A01G 9/029 47/75 |
| 9,930,840 | B1 * | 4/2018 | Gergek | A01G 27/02 |
| 2006/0150499 | A1 * | 7/2006 | Aiba | A01G 9/021 47/65.7 |
| 2006/0156625 | A1 * | 7/2006 | Abney, II | A01G 9/02 47/73 |
| 2007/0062114 | A1 * | 3/2007 | Kruer | A01G 9/02 47/65.8 |
| 2010/0037517 | A1 * | 2/2010 | Copping | A01G 27/005 47/79 |
| 2012/0198767 | A1 * | 8/2012 | Hansen | A01G 27/06 47/81 |
| 2012/0266533 | A1 | 10/2012 | Hoff | |
| 2013/0205664 | A1 | 8/2013 | Hashimoto | |
| 2013/0228238 | A1 * | 9/2013 | Li | E03D 1/32 137/435 |
| 2015/0208595 | A1 * | 7/2015 | Wood | A01G 27/005 47/79 |
| 2016/0021837 | A1 * | 1/2016 | Kernahan | A01G 31/02 47/62 A |
| 2016/0057951 | A1 * | 3/2016 | Van Twist | A01G 9/028 47/62 A |
| 2017/0188525 | A1 | 7/2017 | Paige, Sr. | |
| 2018/0368334 | A1 * | 12/2018 | Wang | A01G 9/02 |

FOREIGN PATENT DOCUMENTS

| | | | |
|---|---|---|---|
| WO | 2001/38778 | 5/2001 | |
| WO | 2005/084418 | 9/2005 | |
| WO | 2006/106518 | 10/2006 | |
| WO | WO-2018016958 A1 * | 1/2018 | ........... A01G 27/006 |

OTHER PUBLICATIONS

Karin Kloosterman, Plastic Irrigation Trays Make The Most of Dew and Weeding Obsolete, Jun. 24, 2009.
Tal-Ya Featured as Company which Fights World Hunger, Sep. 24, 2015.
Tal-Ya Wins Runner-Up in Imagine H2O Competition, Feb. 1, 2015.
Tokyo Keiso Co. Ltd., Technical Guidance—Constant Flow Valves, Jan. 2009 and Mar. 2012.
Maric Flow Control Australia, Constant Flow Rate Regardless of Pressure, Maric Cataloge V6 Sep. 2011.

* cited by examiner

Fig. 7B

DRIP IRRIGATION SYSTEM

TECHNOLOGICAL FIELD

The present disclosure concerns drip irrigation units and systems, specifically such that comprises a water reservoir.

BACKGROUND ART

References considered to be relevant as background to the presently disclosed subject matter are listed below:
WO 2005/084418
WO 2006/106518

Acknowledgement of the above references herein is not to be inferred as meaning that these are in any way relevant to the patentability of the presently disclosed subject matter.

BACKGROUND

Irrigation systems are widely used for agricultural as well as gardening purposes. Although sophisticated systems, such as sprinklers and drip irrigation systems of the kind described, for example, in WO 2005/084418, are in use in industrialized countries such require investment in costly infrastructure and a link to running water source, typically pressurized water. In most of the developing and 3-world countries such infrastructure and accessibility to pressurized water sources are often not available, less sophisticated methods of irrigation are used.

One of the common methods of irrigation in developing and 3-world countries is flooding the land area to be irrigated with water, typically channeled from a nearby natural water source. The quantity of water provided to each plant is nearly impossible to control when using the flooding method, and often each plant is irrigated by an amount of water which is far larger than that actually needed. In addition, flooding often causes accumulation of water around the base of the plant, which is left standing until either absorbed into the soil or evaporated. Standing water may promote roots decay, as well as attract unwanted pests such as insects and rodents. Loss of water by evaporation is also undesired.

Thus, there is a need for an irrigation system that will provide the ability to control the amount of water provided to plants without the need for complex infrastructure.

GENERAL DESCRIPTION

The present disclosure provides irrigation units and systems which permit control of the amount of water provided to the plant by drip irrigation, as well as allowing irrigation of plants without connecting to a water source. The units and systems of this disclosure are modular, i.e. may be adapted to various types and sizes of plants, easy to deploy without the need of pre-laid infrastructure, and do not necessitate a link to a source of pressurized water. Other advantages of units and systems of this disclosure will be detailed below.

In one of its aspects, the present disclosure provides a drip irrigation unit that comprises a bottom member and a top member.

The bottom member has a bottom member base in which a plant-inserting opening is defined, a peripheral closed-loop wall extending upward from a peripheral edge of the bottom member base to a first apex, thereby forming a general cup-shape. The bottom member also comprises an internal closed-loop wall upwardly extending from a peripheral edge of the plant-inserting opening to a second apex that is lower than the first apex. Both the peripheral and internal walls are integral with the bottom member base, to defining together a generally annular-shaped water reservoir.

The top member of the drip irrigation unit has an aperture and a rim, and an annular surface that is defined between the rim and the aperture. The annular surface is downwardly sloped towards the aperture, to thereby define a general funnel-shape. The top member is connectable to at least one of the first and second apexes of the bottom member, such that the plant-inserting opening and the aperture become aligned once the top member is attached to the bottom member.

The internal closed-loop wall has at least one perforation that is vertically distanced from the bottom member base, the at least one perforation defines a water flow path from the reservoir to the plant-inserting opening.

For assembling the unit, the plant's stalk or stem is inserted into the plant-inserting opening, and the bottom member is slid down the plant's stem until the bottom member base is rested on the ground or soil. In this manner, the internal wall surrounds a portion of the plant's stem. Then, the plant's stem is inserted into the aperture of the top member and the top member is slid downwards along the plant's stem until rested against one or both of the peripheral and internal walls. The top member is then securely connected to the bottom member.

The top member may be connected to the bottom member in any suitable manner. Once the drip irrigation unit is assembled, the top member may be connected to the bottom member in a substantially permanent manner, for example by adhering. Alternatively, the top member may be connected to the bottom member in a detachable manner, permitting disassembling the unit upon will or temporary detachment of the top member for filling the reservoir with water or fertilizer. In some embodiments, the top and bottom members are connected by snap fit engagement, matching threadings, pressure-fitting, and any other suitable connecting means.

Water is introduced into the reservoir either manually, or as described hereinbelow, by connecting the unit to a water source. Once the reservoir is filled with water, water trickles to the plant's base from the reservoir via the perforations in the internal wall, thereby drip irrigating the plant. The amount of water provided to the plant may be determined by the dimensions of the perforation, the number of perforations, the dimensions of the reservoir, and/or the vertical distance of the perforation(s) from the bottom member base (i.e. the shorter the vertical distance the higher the amount of water that may be provided to the plant).

The perforation(s), by some embodiments, may be at least partially internally lined with a lining layer that may have an elastic portion or may be made entirely of an elastic material (e.g. rubber). When the reservoir contains water, the elastic portion of the lining layer may be pushed into the perforation by the water pressure within the reservoir by deforming the elastic portion (or the entire lining layer in case such is made entirely of an elastic material) due its elasticity. Such narrowing controls the outflow of water through the perforation when the reservoir is full, preventing the reservoir from emptying too quickly due to the high water column pressure formed when the reservoir is full. When the level is reduced in the reservoir below a threshold, the water pressure on the lining layer is gradually reduced and the lining layer gradually returns to its original, non-deformed state, in which it no longer forms a narrowing of the perforation. Such a lining layer, thus, helps to regulate the outflow of water from the reservoir when the level of water in the reservoir changes.

In some embodiments, the lining layer has a portion extending towards the perforation and having larger thickness compared to other portions of the layer. In other embodiments, where the perforation has a generally frustoconical shape, the lining layer may have at least a portion extending towards the perforation and having a shape of a wedge.

Once deployed, the drip irrigation unit of this disclosure provides several advantages. First, as the unit's bottom member is rested against the ground, the bottom member base is positioned over the root system. Such positioning provides both for shading and reducing the exposed soil area around the plant's roots and base, thereby reducing the soil's temperature about the root system and minimizes water evaporation from the roots area. In addition, the base somewhat protects the root system from harmful animal activity.

The funnel shape of the top member allows collection of rain water or other precipitants. As the bottom member's plant inserting opening and the top member's aperture are aligned upon assembly and due to the top member's downward slope, water is directed through the aperture and the plant inserting opening to the plant's base and root system.

In addition, water that evaporates from the reservoir may be condensed on the bottom surface of the top member. Due to its funnel shape, such condensed water drips or trickles back to the reservoir, further reducing water loss from the reservoir.

Further, in some embodiments, the top member radially extends beyond the bottom member (namely, the top member may have a radius which is larger than the radius of the bottom member), thereby providing further shading and increased precipitants collecting surface.

Turning to the structure of the internal wall, in some embodiments the closed-loop apex of the internal wall has a radius which is smaller than the radius of the plant-inserting opening. Namely, the internal wall may have a frustoconical shape. This allows the bottom member to leave a portion of the soil around the plant's stem exposed, thereby allowing the water (either dripping through the perforations or collected by the top member) to be more efficiently absorbed into the soil.

In some embodiments, at least one circumferential recess is formed on the reservoir-facing surface of the internal wall. This circumferential recess forms a channel for directing water from the bottom surface of the top member into the reservoir. The recess may be further connected to the perforations (for example by at least one vertical recess, extending vertically from the perforation to the circumferential recess), such that water condensing on the reservoir-facing surface of the internal wall are directed to the perforations.

The drip irrigation unit may, by some embodiments, further comprise an auxiliary divider, that extends upwardly angularly from the bottom member base up to a third apex lower than the second apex. The auxiliary divider is integrally formed with the internal wall along at least a portion of the internal wall's circumference. An auxiliary water reservoir is thus defined between the internal wall and the auxiliary divider.

The auxiliary divider is typically positioned such that the perforations defined in the internal wall are in liquid communication with the auxiliary reservoir. Water condensing on the internal wall, and/or water directed by the circumferential recess, may be directed into the auxiliary reservoir. Thus, even in case where the main reservoir is empty or the level water therein is lower than the perforations, condensed water directed to and collected in the auxiliary reservoir may be utilized for irrigating the plant.

In order to facilitate easier assembly, or for deploying the unit for irrigating large plants, such as shrubs and trees (where the thickness of the stem/trunk or the size of the foliage hinder deployment of the unit), units of this disclosure may be segmented. Thus, in some embodiments, the bottom member may be constituted by at least two bottom member segments, interlocked one with the other. Similarly, in some embodiments, the top member may be constituted by at least two top member segments, interlocked one with the other. Interlocking of the segments may be carried out by any suitable manner, for example by snap-fitting.

According to some embodiments, the bottom member may be fitted with anchor members, such as spikes or hooks, for anchoring the bottom member to soil and prevent undesired movement of the unit. The anchor members may be integrally formed with the bottom member or may be fixed thereto during assembly of the unit. Further, the anchor members may be made of a similar or different material than that of the bottom member.

The unit of this disclosure is typically positioned on the ground, i.e. with the bottom member base resting on the ground. This allows for easy deployment and disassembling, circumventing the need to carry out infrastructure preparation prior to installation. However, as may be appreciated, the unit of this disclosure may be positioned semi-subterraneanly, namely, with at least a portion of the bottom member being sunk into the ground, while the top member is left over ground.

In some embodiments, the drip irrigation unit may be made of an environmentally-resistant material, e.g. metal or plastic. In other embodiments, the drip irrigation unit may be made of a biodegradable material. The top and bottom members may be made of the same material or from different materials.

As a person of the an would appreciate, the unit of this disclosure may be used for a variety of plants, for example, perennials (such as trees, shrubs, evergreens, etc.), annuals, biennials, herbs, and others.

Although the drip irrigation unit of this disclosure may be used as a stand-alone unit, i.e. in which the water is filled into the reservoir manually or by collection of precipitants, the unit may be connected to a water source, such as a larger water reservoir or a source of running water.

Thus, in some embodiments, the unit may further comprise a water inlet formed at the peripheral wall.

Similar to the perforation(s), the water inlet may be lined with a lining layer having at least a portion made of elastic material to regulate the water pressure of the water entering the drip irrigation unit when using an external water source. Using such a lining layer when connecting the drip irrigation unit to an external water source assists in prolonging the serviceable lifespan of the unit by preventing exceeding water pressure to be applied internally on to peripheral wall due to excess filling of the unit. Such a lining later also provides flexibility of installation when placing the water irrigation unit in an open environment, as well as enabling filling the drip irrigation unit using "communicating vessels" law (for example by placing the drip irrigation unit downhill and using an external water source which is on an elevated surface, such as uphill).

In some embodiments, at least one of the perforation(s) and the water outlet are lined with the lining layer. In other embodiments, both the perforation(s) and the water outlet are lined with the lining layer. This provides the user with the flexibility to install the water irrigation unit at the outlet of a water source (in which the low water pressure is compensated by the lining layer located at the perforations)

or at an entrance faucet to the irrigation system (in which the high pressure is regulated by the lining layer at the water inlet). In such a manner, the drip irrigation unit is configured to ensure a substantially constant water drip supply to the plant.

In addition, in some embodiments, the unit may comprise an outlet, optionally selectively sealable, formed at the peripheral wall, which may be used water drainage.

According to some embodiments, the unit may comprise both an inlet and an outlet, both formed at the peripheral wall. Such a setup may be used to interconnect several adjacent units one to other or to form a flood irrigation system.

In another aspect, this disclosure provides a system for drip irrigation comprising at least one drip irrigation unit as described herein, wherein each unit further comprises a water inlet defined in the peripheral wall of the unit, and means for connecting the inlet to a water source.

A further aspect provides a system for drip irrigation comprising a plurality of drip irrigation units as described herein, wherein each unit further comprises a water inlet and a water outlet defined in the peripheral wall of the unit, and means for connecting the inlets to a water source.

In some embodiments, at least two units in said plurality are in liquid communication with one another, such that the outlet of one unit is in liquid communication with an inlet of the other unit.

The means for connecting the units one to the other may be any suitable tubing element, rigid or flexible, that enable water flow between the units.

According to some embodiments, the tubing elements may be further furnished with flow regulating means, such as valves, to permit, regulate and/or control water flow between the units.

In another aspect, this disclosure provides a kit for assembling the unit described herein, the kit comprises at least one of said bottom members and at least one of said top members.

In yet a further aspect, this disclosure provides a kit for assembling the system described herein, the kit comprising a plurality of top members, a plurality of bottom members and at least one tubing member.

According to some embodiments, the kits may further comprise means for connecting the top member to the bottom member. According to other embodiments, the kits may further comprise instructions for assembly and/or for use.

It is further to be understood, that the drip irrigation system may include stand-alone units to be assembled in the field; namely, the cup-shaped bottom member need not necessarily be integral with the internal closed-loop wall, but rather the internal closed-loop wall may be a stand-alone unit that is configured to be received with a stand-alone bottom unit. For example, a stand-alone closed-loop wall may be configured to be received within a used tire, that functions as a bottom and surrounding unit.

Thus, in another aspect, the disclosure provides a drip irrigation member, comprising a tubular member defined by a closed-loop wall extending between a bottom edge that defines a bottom opening and a top edge that defines a top opening, and having at least one perforation that is vertically distanced from the bottom plant-inserting opening; the tubular member configured (a) to be received within a bottom, generally cup-shaped, member having a bottom member base in which a plant-inserting opening is defined and a peripheral closed-loop wall extending upward from a peripheral edge of the bottom member to a first apex, such that once received within the bottom member, (i) the tubular member extends upwards from a peripheral edge of the plant-inserting opening such that its top edge defines second apex that is lower than the first apex, and (ii) the peripheral wall, the tubular member and the bottom member base define a water reservoir, such that the at least one perforation defines a water flow path from the reservoir to the plant-inserting opening, and (b) to receive a top member having an aperture and a rim, an annular surface defined between the rim and the aperture being downwardly sloped towards the aperture and defining a generally funnel-shaped, the top opening of the tubular member being configured to receive said top member.

In some embodiments, the tubular member is frustoconical (i.e. has a frustoconical shape).

The drip irrigation member may further comprise an auxiliary divider of the kind described hereinabove.

In another aspect, this disclosure provides a system for drip irrigation comprising at least one drip irrigation member as described herein, and at least one top member configured to be received at the top opening of the drip irrigation member and having an aperture and a rim, an annular surface defined between the rim and the aperture being downwardly sloped towards the aperture and defining a generally funnel-shaped. In some embodiments, such a system may further comprise a bottom, generally cup-shaped, member having a bottom member base in which a plant-inserting opening is defined and a peripheral closed-loop wall extending upward from a peripheral edge of the bottom member to a first apex, such that once received within the bottom member, (i) the tubular member extends upwards from a peripheral edge of the plant-inserting opening such that its top edge defines second apex that is lower than the first apex, and (ii) the peripheral wall, the tubular member and the bottom member base define a water reservoir, such that the at least one perforation defines a water flow path from the reservoir to the plant-inserting opening.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Although the units that will now be described are shown to have a generally circular cross-section, it is of note that other shapes of units are also contemplated within the scope of this disclosure. Namely, the units may have a circular cross-section or any other cross-sectional shape, such as oval, triangular, square, hexagonal, polygonal, etc.

Figure 1A:
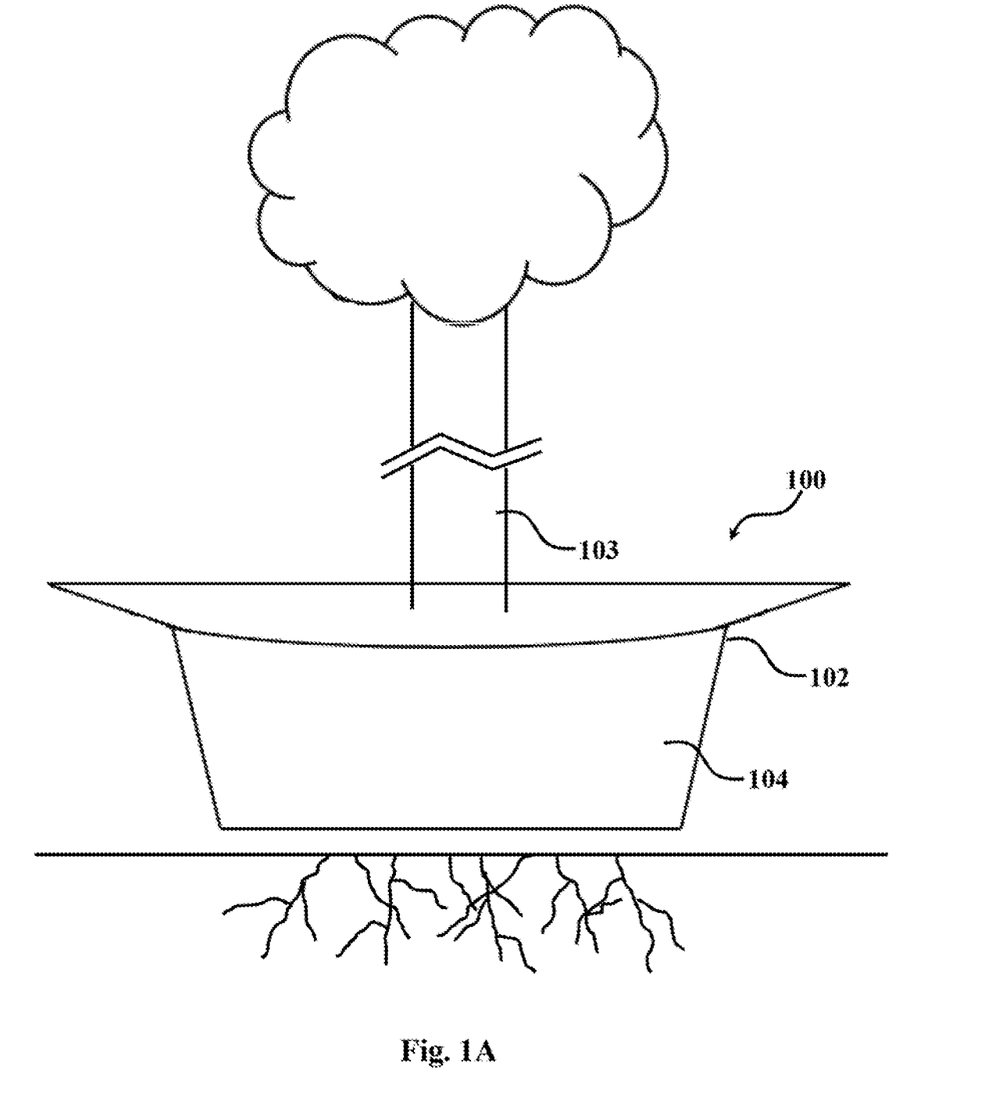
FIGS. 1A and 1B show schematic side view and schematic top perspective view, respectively, of a unit according to an embodiment of this disclosure.
Figure 1B:
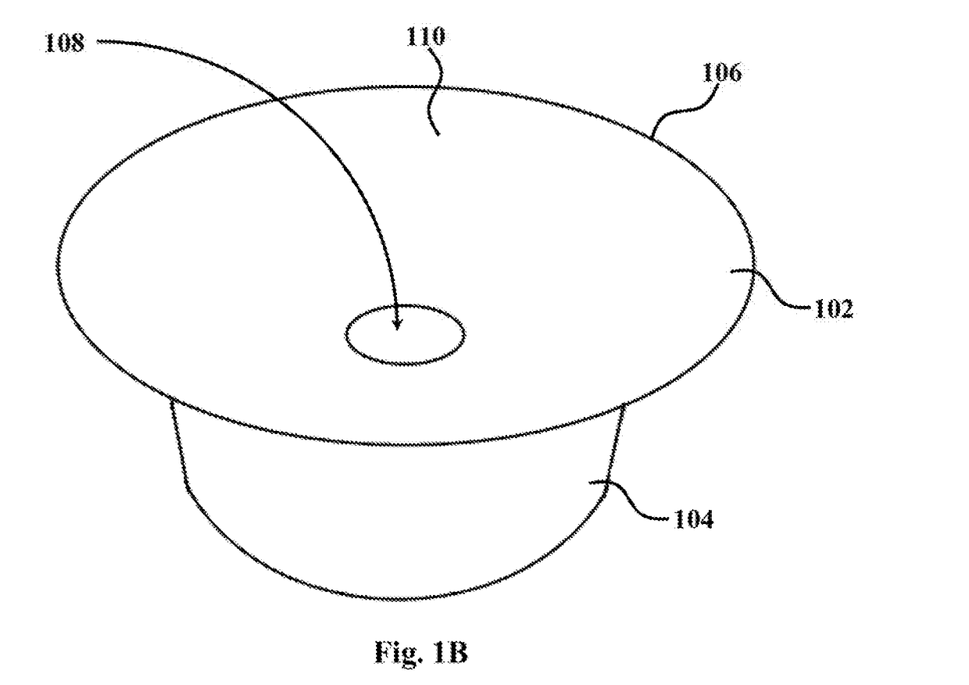

A drip irrigation unit of this disclosure is generally depicted in FIG. 1. The unit 100 includes a top member 102 and a bottom member 104, which are connectable to one another, e.g. by snap-fitting, in order to form the unit 100. The unit is positioned such that the bottom member rests against the ground and over the root system of the plant, thereby providing protection against animals and minimizing evaporation of water from the soil around the root system. The unit is deployed such that the plant's stem/trunk 103 passes through both the bottom and top members of the unit, as will be described below in more details.

Figure 2:
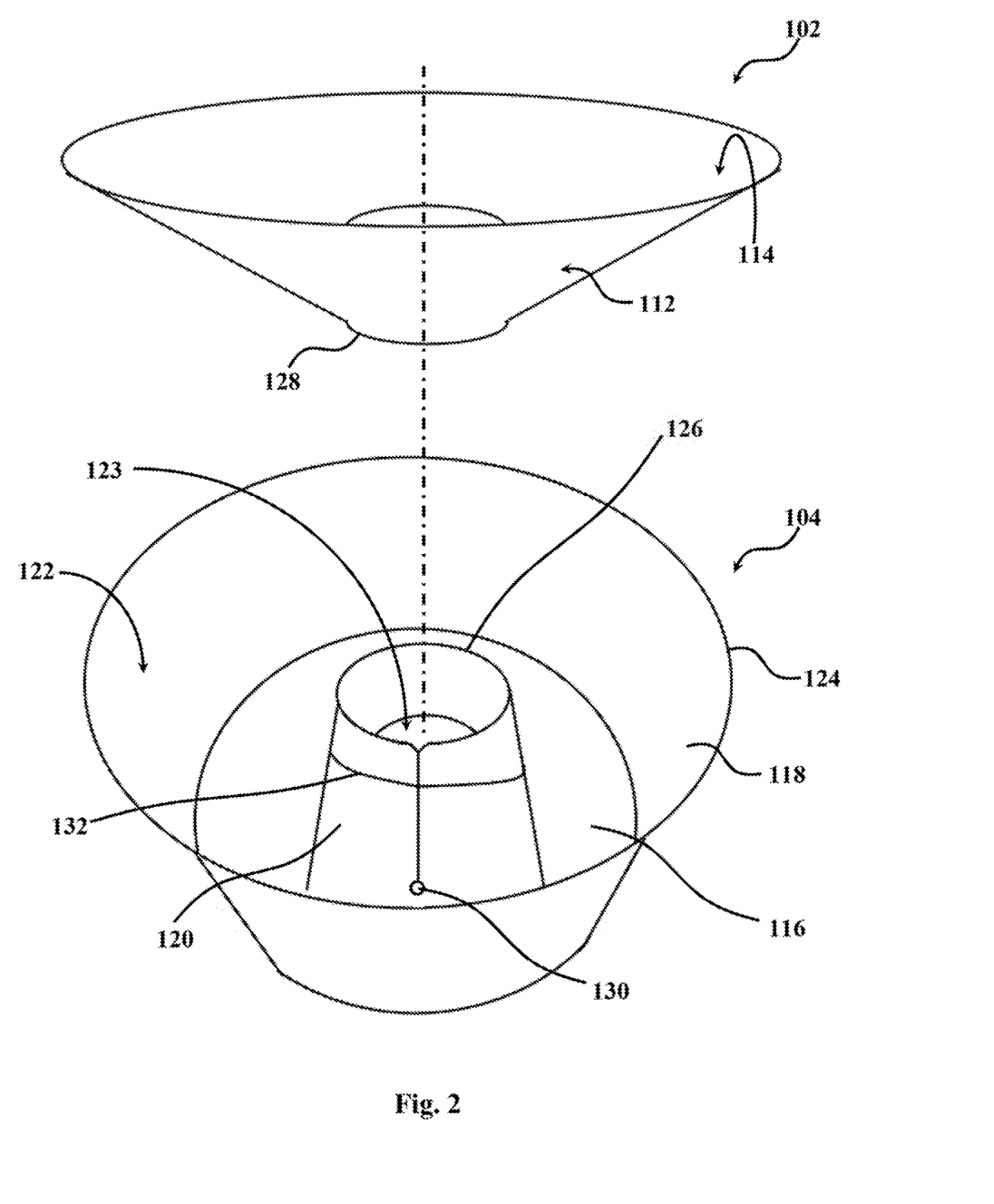
FIG. 2 is a schematic exploded view of a unit according to an embodiment of this disclosure.

As can better be seen in FIG. 1B and FIG. 2, the bottom member 104 has a bottom member base 116 that rests on the ground above the plant's root system, a peripheral closed-loop wall 118 that extends upward from a peripheral edge of the base 116 to a first apex 124. This results in a bottom member that is generally cup-shaped. A plant-inserting opening 123 is defined at the base 116, typically but not exclusively at the base's center. The bottom member also includes an internal closed-loop wall 120 that extends upward from a peripheral edge of the plant-inserting opening 123 to a second apex 126 that is lower than the first apex 124. As noted above, the peripheral wall 118 and the internal wall 120 are integral with the bottom member base 116 thereby forming a generally annular-shaped water reservoir 122 that is defined between the peripheral and internal walls and the base.

The top member 102 has an aperture 108 and a rim 106, and an annular surface 110 that is defined between the rim 106 and the aperture 108 and is downwardly sloped towards the aperture, thus defining a general funnel-shape. The top member 102 is connectable to the bottom member 104 such that the plant-inserting opening 123 and the aperture 108 become aligned upon assembly of the unit. As noted above, such a funnel shape directs water collected from precipitants towards the root system (possible by the alignment of the aperture and the plant-inserting opening), as well as provides a surface (i.e. surface 114) for condensation of water vapors and air-carried moisture. Further, the bottom surface 112 of the top member 102 allows additional condensation of water evaporating from reservoir 122, and due to the funnel shape, such condensed water drips or trickles back to the reservoir, further reducing water loss from the reservoir.

As can be seen in FIGS. 1A-2, the top member 102 typically radially extends beyond the bottom member 104, allowing for further shading of the root system and increased precipitants collecting surface.

To assemble the unit, plant stem 103 is inserted into the plant-inserting opening 123, such that the internal wall 120 surrounds a portion of stem 103. Then, the stem is inserted into the aperture 108 of the top member 102 and the top member is connected to the bottom member 104, for example by resting the top member's seat 128 against the second apex 126. The top member may also be rested against the first apex 124, or connected to the bottom member in any suitable manner that would ensure alignment of the aperture and the plant-inserting opening. For plant having a stiff or wide stem, or those having a broad foliage, preventing sliding of the unit along the stem, segmented units may be utilized, as described hereinbelow.

Figure 3A:
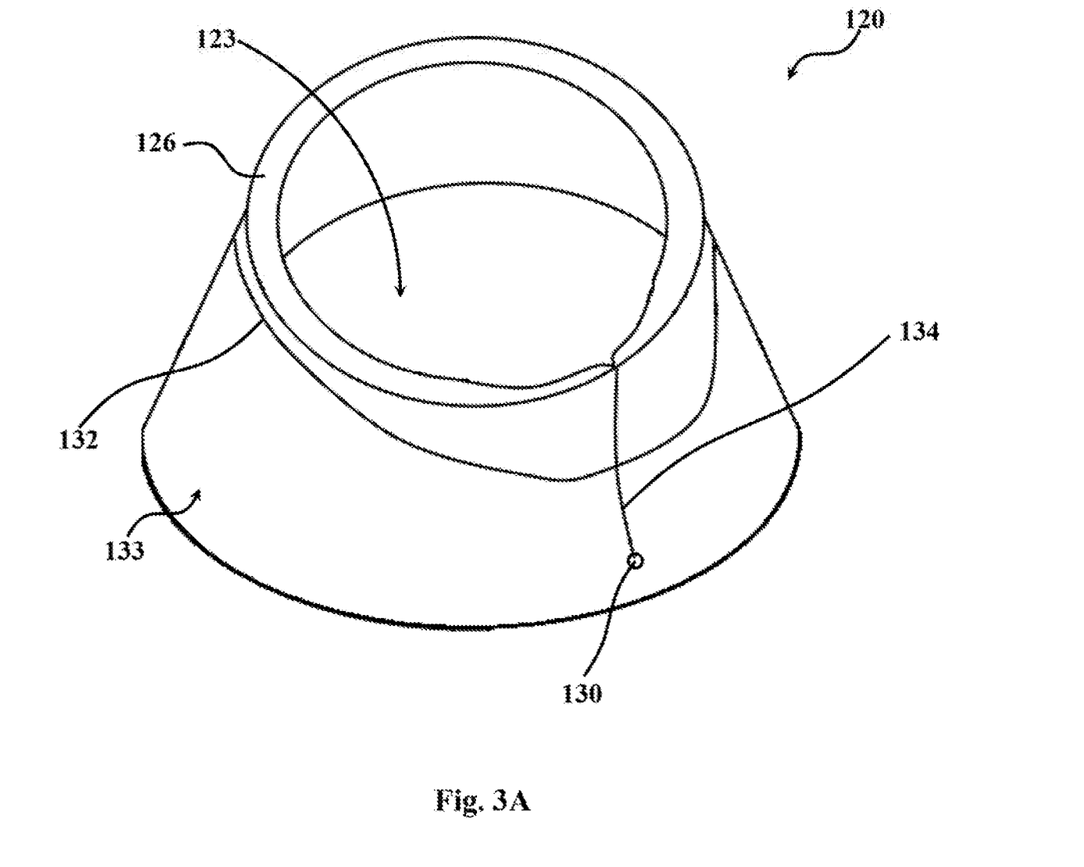
FIGS. 3A and 3B are schematic perspective views of the internal wall of the bottom member, with and without the auxiliary divider, respectively.
Figure 3B:
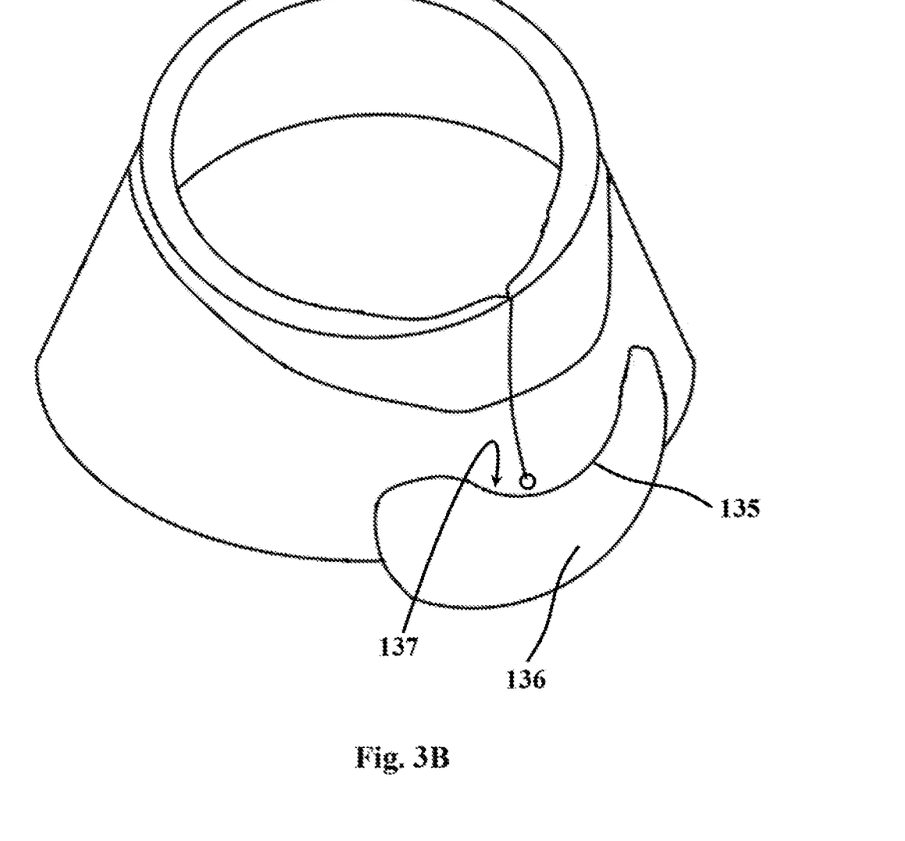

The structure of the internal wall 120 may best be seen in FIGS. 3A-3B, which show the internal wall in isolation. The internal closed-loop wall 120 has at least one perforation 130 at a defined vertical distance from the bottom member base 116. Although only one perforation is depicted in connection with this embodiment, the person versed in the art would appreciate that more than one perforation may be used, either along the same imaginary circumferential line (i.e. a plurality of perforations distributed along the wall's circumference, each having the same vertical distance from the base 116), or at different vertical distances from base 116. The perforation(s) 130 defines a water flow path from the reservoir 122 to the plant-inserting opening 123, thereby allowing water to drip from the reservoir to the soil as long as the water level in reservoir 122 is above perforation 130.

In some cases the closed-loop apex 126 of the internal wall 120 has a radius which is smaller than the radius of the plant-inserting opening 123, leaving a portion of the soil around the plant's stem exposed for more efficient water absorption.

In addition to the perforation, at least one circumferential recess 132 is formed on the reservoir-facing surface 133 of the internal wall 120. This circumferential recess functions as a channel that directs water from the bottom surface 112 of the top member into the reservoir 122. The recess 133 may be further connected to the perforations by a vertical recess 134, that extends vertically from the perforation 130 to the circumferential recess 133. The vertical recess allows water condensing on the reservoir-facing surface of the internal wall to be directed to the perforations.

In order to permit irrigation when the water level in the reservoir drops below the perforation, the internal wall 120 may be integrally formed with an auxiliary divider 136, seen in FIG. 3B. The auxiliary divider 136 extends upwardly angularly to a third apex 135 lower than the second apex 126. The auxiliary divider is typically integrally formed with the internal wall along at least a portion of the internal wall's circumference, forming an auxiliary water reservoir 137 between the internal wall 120 and the auxiliary divider 136. The auxiliary divider is positioned such that the perforations 130 are in liquid communication with the auxiliary reservoir 137. When the water level in the reservoir 122 drops below the perforation 130, water condensing on the internal wall 120 and/or water directed by the circumferential recess 132 are directed into the auxiliary reservoir 137. Thus, even in case where reservoir 122 is empty or the level water therein is lower than the perforations, condensed water directed to and collected in the auxiliary reservoir 137 may be utilized for irrigating the plant.

As noted above, although the internal wall 120 is exemplified as being an integral part of the bottom member 104, it is also contemplated within the scope of this disclosure that the internal wall may be a stand-alone unit, configured to be received within a stand-alone cup-shaped bottom unit.

Figure 4:
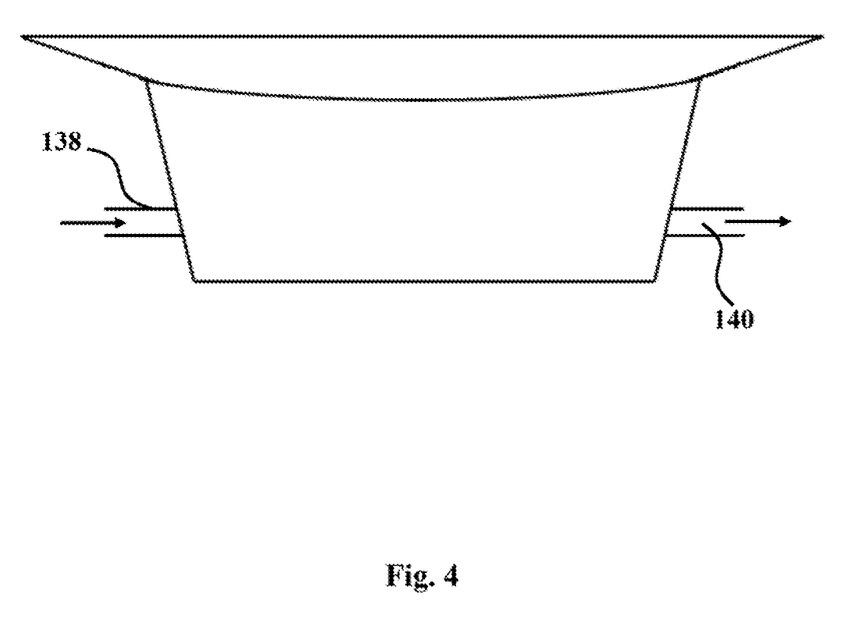
FIG. 4 shows a schematic side view of a unit including an inlet and outlet according to an embodiment of this disclosure.

The drip irrigation unit may further include at least one of a water inlet 138 and a water outlet 140, both formed at the peripheral wall 118, seen in FIG. 4. Thus, although the unit may be filled with water manually, the unit may be alternatively provided with water from an external water source. The outlet and inlet may be used to connect several units to the same water source or interconnect one unit to another by coupling between the outlet of one unit and the inlet of another unit. Thus, an irrigation system including a plurality of units may be formed. Such a system allows irrigation of several plants simultaneously, as well as permitting even distribution of water between the reservoirs of the units linked to the same system in case of increased inflow of water/precipitants.

Figure 5:
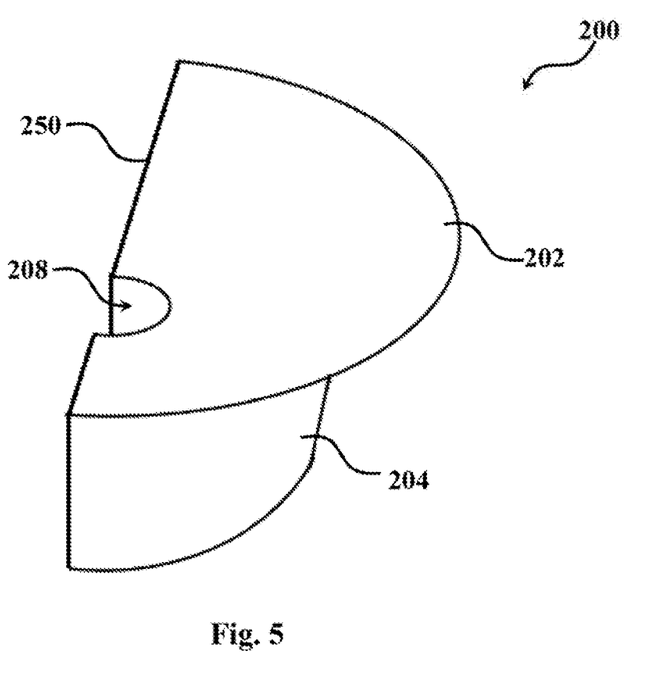
FIG. 5 shows a perspective top view of a unit according to another embodiment of this disclosure.

Units of this disclosure may also be utilized for drip irrigating plants that are planted along walls or fences. A unit of this disclosure that is adapted for such utilization is depicted in FIG. 5. In such a design, instead of having a circular cross-section, a unit 200 that are suitable for positioning adjacent to a wall has a semi-circular cross section (i.e. half a circle), constituted by top member 202, bottom member 204 and peripheral wall section 250. Peripheral wall section 250 is attached to the wall or fence next to which the plant is planted; in order to assure that the unit remains in place, peripheral wall section 250 may be adhered or attached by any suitable means to the wall or fence next to which the plant is planted.

Figure 6:
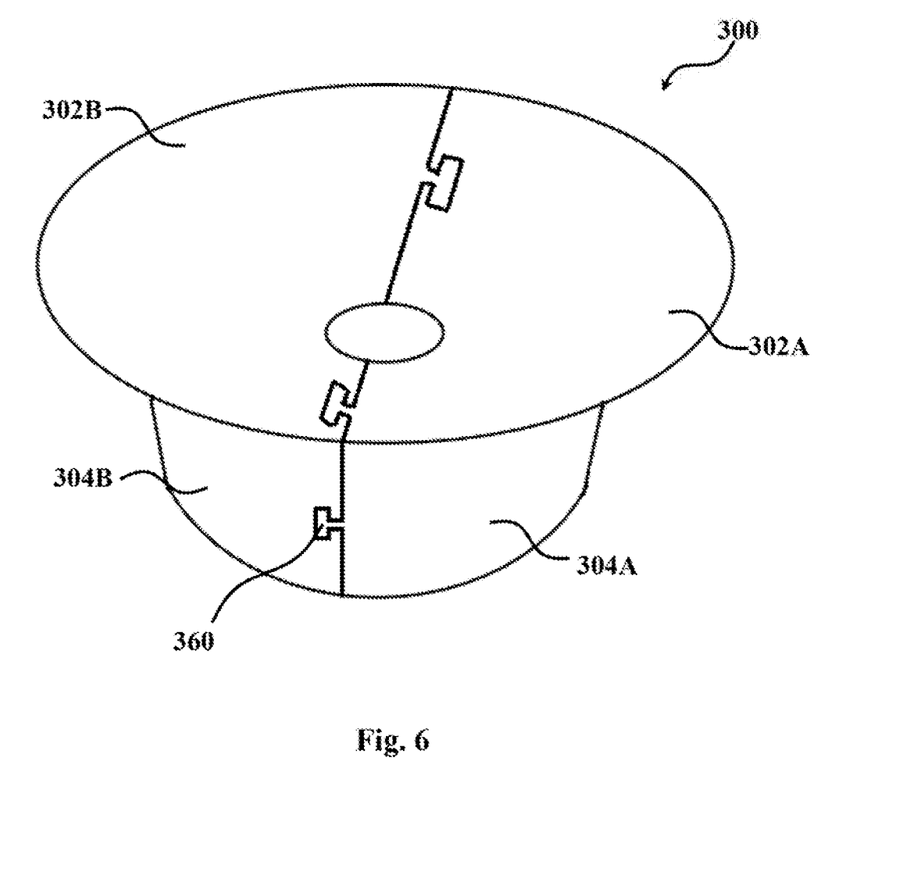
FIG. 6 shows a perspective top view of a multi-segment unit according to another embodiment of this disclosure.

Deployment of the unit for irrigating large plants, such as shrubs and trees (where the thickness of the stem/trunk or the size of the foliage), is afforded by segmenting the unit into several interlocking segments, which are easily assembled to form the unit. Such segmentation provides for flexibility of size and shape of the unit. A segmented unit is depicted in FIG. 6, in which unit 300 is assembled from two bottom member segments 304A and 304B, and the top member is formed from at least two top member segments 302A and 302B. The segments are interlocked one with the other via water-tight interlocking arrangements 360, which, by one example, may be a snap-fitting arrangement.

Figure 7A:
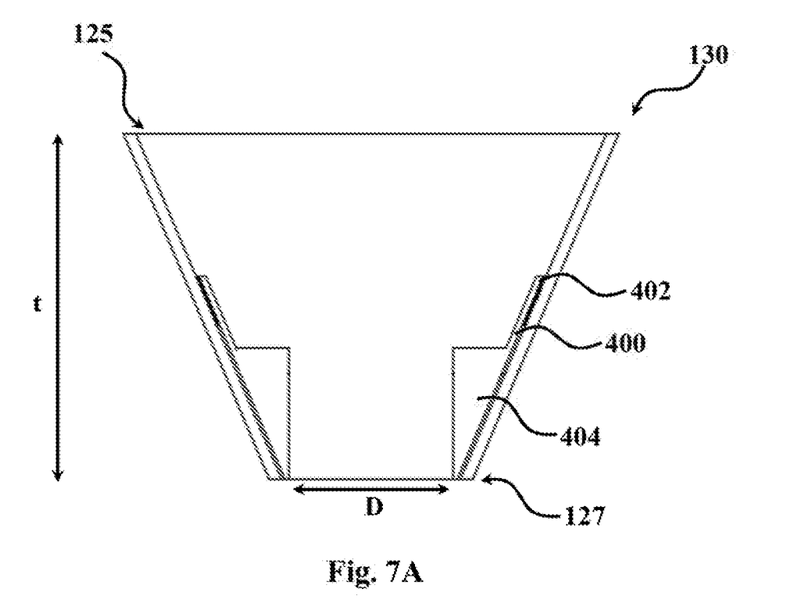
FIGS. 7A-7B show schematically a cross-section of the water perforation of the reservoir fitted with a lining layer that has an elastic portion according to another embodiment of this disclosure in a low water-level of the reservoir (FIG. 7A) and a high water-level of the reservoir (FIG. 7B).
Figure 7B:
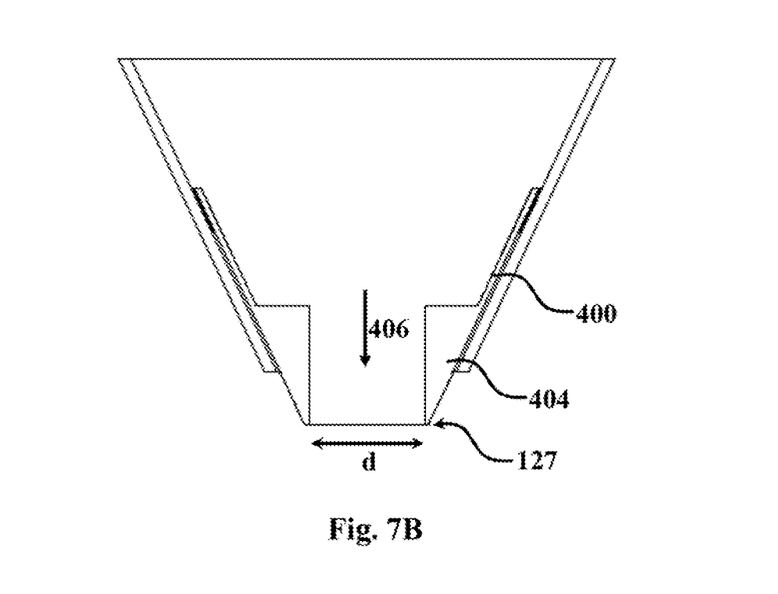

As noted above, the perforation 130 is formed in the internal closed-loop wall 120. The internal wall typically has a thickness t (as seen in FIGS. 7A-7B) and the perforation 130 extends from an internal face of the internal wall 125 to the opposite, external face of the internal wall 127, thus having the length t. As noted above, as shown in FIGS. 7A-7B, the perforation 130 may be internally lined with a lining layer 400, having at least a portion thereof made of an elastic material (e.g. rubber), that is affixed to the perforation's walls at a location 402 adjacent the internal face of wall 120. In the example shown in FIGS. 7A-7B, the perforation has a frustoconical cross-section, and the lining layer 400 has a frustoconical shape matching that of the perforation. The lining layer has a portion with increased thickness 404 that extends towards the external face 127—in this specific example the portion of increased thickness has a wedge-like shape.

As the lining layer is affixed at location 402 to interior of the perforation 130, its elastic portion is capable of deforming without detaching or sliding from the interior of the perforation due to the elasticity of the layer. In this specific example, one or both of portions 402 and 404 may be made of an elastic material. When the reservoir contains water exceeding a pre-determined threshold, the lining layer 400 may be pushed into the perforation 130 (generally in the direction indicated by arrow 406) by the water pressure within the reservoir as the elastic portion is deformed by the water pressure into the position shown in FIG. 7B, the deformation being permitted by the portion's elasticity. Such deformation effectively decreases the radius of the perforation's opening at the external face 127 from its original diameter D to a reduced diameter d, thereby functioning to control the water outflow from the reservoir. When the water level is reduced in the reservoir below said threshold, the water pressure on the elastic layer 400 is gradually reduced and the elastic portion of the lining layer gradually returns to its original, non-deformed state, in which it no longer forms a narrowing of the perforation, as seen in FIG. 7A. The lining layer, thus, helps to regulate the outflow of water from the reservoir when the level of water in the reservoir changes.

It should be noted that perforation 130 may be partially internally lined with lining layer 400, e.g. lining layer 400 may not cover perforation 130 entire inner radius.

In other arrangements (not shown) the lining layer may be affixed at inlet 138 (or both of the inlet 138 and the perforation 130 may be lined with a lining layer which comprises at least an elastic portion), regulating the water pressure of the water entering the drip irrigation unit when using an external water source. Using the lining layer to regulate the water pressure entering the drip irrigation when using an external water source may help prolong the lifespan of the water irrigation unit (preventing exceeding water pressure being applied internally on to peripheral wall 118, due to exceeding filling of the unit) and enable flexibility when placing the water irrigation unit in an open environment. The increase of flexibility when placing the water irrigation unit may save energy, and enable filling the drip irrigation unit using "communicating vessels" law, for example by placing the drip irrigation unit downhill and using an external water source which is on an elevated surface, such as uphill.

The invention claimed is:

1. A drip irrigation unit, comprising:
a bottom, generally cup-shaped, member having a bottom member base in which a plant-inserting opening is defined, a peripheral closed-loop wall extending upward from a peripheral edge of the bottom member to a first apex, and an internal closed-loop wall extending upwards from a peripheral edge of the plant-inserting opening to a second apex that is lower than the first apex, the peripheral and internal walls being integral with the bottom member base and defining a water reservoir, and
a top member having an aperture and a rim, an annular surface defined between the rim and the aperture being downwardly sloped towards the aperture and defining a generally funnel-shape, the top member being connectable to at least one of the first or second apexes, such that the plant-inserting opening and the aperture become aligned,
the internal closed-loop wall having at least one perforation vertically distanced from the bottom member base, the at least one perforation defining a water flow path from the reservoir to tire plant-inserting opening,
wherein the at least one perforation is at least partially internally lined with a lining layer having at least a portion made of an elastic material deforms without detaching from the interior of the at least one perforation so that such deformation decreases the radius of the opening of the at least one perforation to control the water outflow.

2. The drip irrigation unit of claim 1, wherein the top and bottom members are connected by snap fit engagement, matching threadings, or pressure-fitting.

3. The drip irrigation unit of claim 1, wherein the closed-loop apex of the internal wall has a radius which is smaller than the radius of the plant-inserting opening, such that the internal wall is provided with a slope.

4. The drip irrigation unit of claim 1, wherein the internal wall defines a generally frustoconical shape.

5. The drip irrigation unit of claim 1, wherein the top member extends radially beyond the bottom member.

6. The drip irrigation unit of claim 1, comprising an auxiliary water reservoir defined between the internal wall and an auxiliary divider extending upwardly angularly from the bottom member base up to a third apex lower than the second apex, the auxiliary divider being integrally formed with the internal wall along at least a portion of the internal wall's circumference.

7. The drip irrigation unit of claim 1, wherein at least one circumferential recess is formed on the reservoir-facing surface of the internal wall.

8. The drip irrigation unit of claim 7, wherein the reservoir-facing surface of the internal wall is formed with at least one vertical recess, extending vertically from said at least one perforation to said at least one circumferential recess.

9. The drip irrigation unit of claim 1, wherein the lining layer has a portion extending towards the perforation and having larger thickness compared to other portions of the lining layer.

10. The drip irrigation unit of claim 1, wherein, when the perforation has a generally frustoconical shape, the lining layer has at least a portion having a shape of a wedge extending towards the perforation.

11. The drip irrigation unit of claim 1, wherein either or both of the bottom member and the top member are constituted by at least two bottom member segments or at least two top member segments, respectively, interlocked one with tire other.

12. The drip irrigation unit of claim 1, further comprising a water inlet and/or a water outlet formed at the peripheral wall.

13. A system for drip irrigation comprising:
a plurality of drip irrigation units of claim 1, wherein each unit further Comprises a water inlet and a water outlet defined in the peripheral wall of the unit, and
means for connecting the inlets to a water source.

14. A kit for assembling the unit of claim 1, the kit comprises at least one of said bottom members and at least one of said top members.

15. The kit of claim 14, further comprising means for connecting the top member to the bottom member.

16. A kit for assembling the system of claim 13, the kit comprising a plurality of top members, a plurality of bottom members and at least one tubing element.

17. A drip irrigation member, comprising:
a tubular member defined by a closed-loop wall extending between a bottom edge that defines a bottom opening and a top edge that defines a top opening, and having at least one perforation vertically distanced from the bottom opening, wherein the at least one perforation is at least partially internally lined with a lining layer having at least a portion made of an elastic material deforms without detaching from the interior of the at least one perforation so that such deformation decreases the radius of the opening of the at least one perforation to control the water outflow,
the tubular member configured
(a) to be received within a bottom, generally cup-shaped, member having a bottom member base in which a plant-inserting opening is defined and a peripheral closed-loop wall extending upward from a peripheral edge of the bottom member to a first apex, such that once received within the bottom member, (i) the tubular member extends upwards from a peripheral edge of the plant-inserting opening such that its top edge defines a second apex that is lower than the first apex, and (ii) the peripheral wall, the tubular member and the bottom member base define a water reservoir, such that the at least one perforation defines a water flow path from the reservoir to the plant-inserting opening, and
(b) to receive a top member having an aperture and a rim, an annular surface defined between the rim and the aperture being downwardly sloped towards the aperture and defining a generally funnel-shape, the top opening of the tubular member being configured to receive said top member.

18. The drip irrigation member of claim 17, wherein the tubular member is frustoconical.

19. A system for drip irrigation comprising at least one drip irrigation member of claim 17, and at least one top member configured to be received at the top opening of the drip irrigation member and having an aperture and a rim, an annular surface defined between the rim and the aperture being downwardly sloped towards the aperture and defining a generally funnel-shape.

20. The system of claim 19, further comprising a bottom, generally cup-shaped, member having a bottom member base in which a plant-inserting opening is defined and a peripheral closed-loop wall extending upward from a peripheral edge of the bottom member to a first apex, such that once received within the bottom member, (i) the tubular-member extends upwards from a peripheral edge of the plant-inserting opening such that its top edge defines a second apex that is lower than the first apex, and (ii) the peripheral wall, tire tubular member and the bottom member base define a water reservoir, such that the at least one perforation defines a water flow path from the reservoir to the plant-inserting opening.

* * * * *